United States Patent [19]

Kanno et al.

[11] Patent Number: 4,925,282
[45] Date of Patent: May 15, 1990

[54] ZOOM LENS ASSEMBLY

[75] Inventors: Hideo Kanno, Chiba; Hitoshi Imanari, Kawasaki; Hideshi Naito; Yoshiro Kodaka, both of Tokyo; Naoto Ohta, Chigasaki, all of Japan

[73] Assignee: Nikon Corporation, Tokyo, Japan

[21] Appl. No.: 199,714

[22] Filed: May 27, 1988

[30] Foreign Application Priority Data

Jun. 4, 1987 [JP] Japan .............................. 62-138999
Oct. 12, 1987 [JP] Japan .............................. 62-254778

[51] Int. Cl.$^5$ ............................................. G02B 15/00
[52] U.S. Cl. .................................................. 350/429
[58] Field of Search ................ 350/429, 430; 354/400, 354/195.12, 195.13

[56] References Cited

U.S. PATENT DOCUMENTS

| | | | |
|---|---|---|---|
| 4,275,952 | 6/1981 | Uesugi ................................. | 350/429 |
| 4,621,906 | 11/1986 | Hashimoto et al. .................. | 350/429 |
| 4,681,406 | 7/1987 | Naito et al. .......................... | 350/429 |
| 4,729,644 | 3/1988 | Ueyama ................................ | 350/429 |
| 4,806,000 | 2/1989 | Shiokama et al. ................... | 350/429 |

*Primary Examiner*—Bruce Y. Arnold
*Assistant Examiner*—Loha Ben
*Attorney, Agent, or Firm*—Shapiro and Shapiro

[57] ABSTRACT

A zoom lens assembly comprises a photo-taking optical system having a focusing portion, a zooming portion, and an optic axis, a manual operator movable in the direction of the optic axis for zooming and rotatable about the optic axis for focusing, an electrically rotated drive shaft, a member for moving the zooming portion of the photo-taking optical system for zooming in response to the movement of the manual operator in the direction of the optic axis, an intermediate member rotatable in response to the rotation of the manual operator to move the focusing portion of the photo-taking optical system for focusing, and movable in the direction of the optic axis with the manual operator, a transmission system for coupling the intermediate member to the drive member for movement in the direction of the optic axis to thereby transmit the rotation of the drive member to the intermediate member irrespective of the movement of the intermediate member in the direction of the optic axis, and a change-over device operable to connect and disconnect the rotation of the manual operator and the intermediate member.

15 Claims, 4 Drawing Sheets

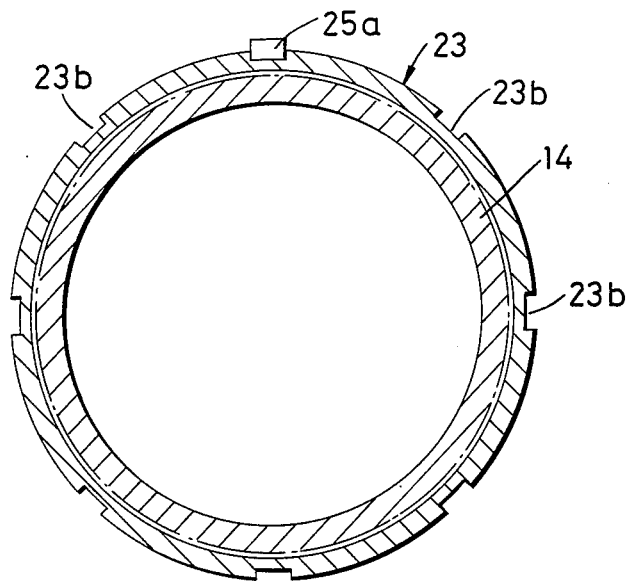
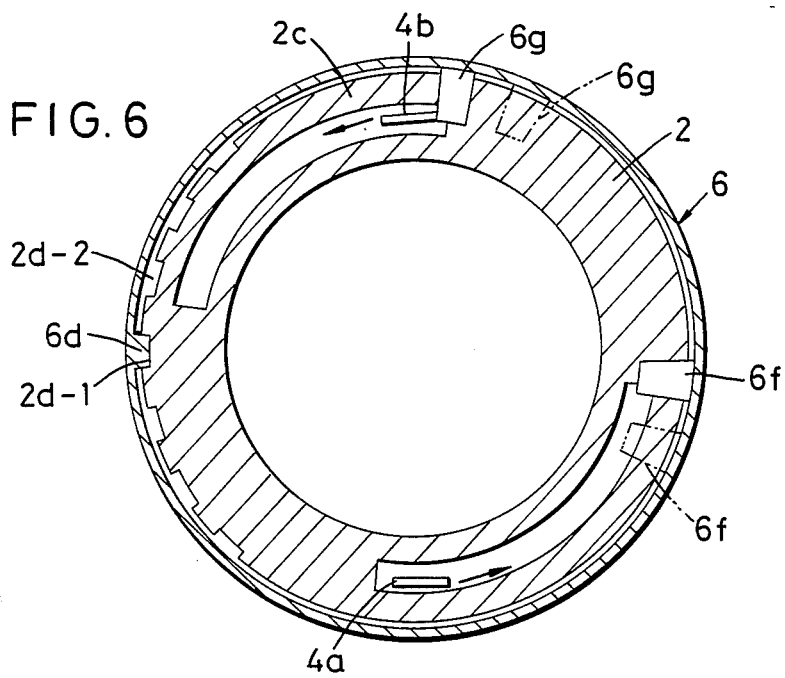

ZOOM LENS ASSEMBLY

BACKGROUND OF THE INVENTION

1. Field of the Invention

This invention relates to a zoom lens assembly for a photographic camera, and more particularly to a zoom lens assembly capable of changing over automatic focusing and manual focusing by a simple operation.

2. Related Background Art

The well-known one-hand zoom lens assembly is such that zooming is accomplished by moving an operating ring in the direction of the optic axis and focusing is accomplished by rotating the operating ring. If the conventional focus adjusting mechanism in a single-lens reflex camera is intactly adopted in the zoom lens assembly of this type, the operating ring will rotate during automatic focus adjustment to prove a hindrance to the holding of the lens barrel and make it impossible to effect the zooming operation simultaneously with automatic focus adjustment.

There is also known a zoom lens assembly capable of automatic focus adjustment which is provided with a zoom ring rectilinearly movable in the direction of the optic axis for the zooming operation and a focus ring rectilinearly movable therewith and rotatable about the optic axis for focus adjustment. Again in such a zoom lens assembly, the focus ring rotates during automatic focus adjustment and therefore, if the focus ring is touched inadvertently, automatic focus adjustment will be adversely affected. Also, it is conceivable to form the focus ring itself with a narrow width so as to prevent the focus ring from being touched inadvertently, but this is not preferable in that the operability for manual focus adjustment becomes worse.

SUMMARY OF THE INVENTION

It is a primary object of the present invention to provide a one-hand zoom lens assembly capable of automatic focus adjustment and manual focus adjustment which is excellent in operability.

It is another object of the present invention to provide a one-hand zoom lens assembly in which an operating ring for effecting zooming and focusing is not rotated during automatic focus adjustment and the automatic focus adjusting operation is possible even during the zooming operation.

The zoom lens assembly according to the present invention is provided with an intermediate member having a first connecting portion for receiving a drive force from moving means for automatic focus and a second connecting portion engageable/disengageable with an interlocking member intermediate provided between an operating ring and a focus system in response to the change-over operation of automatic mode/manual mode change-over means. Thereby, during the manual mode, the operating means and the focus system are connected together through the second connecting portion to make the manual focus adjustment by the operating ring possible, and during the automatic mode, the connection between the operating ring and the focus system is released through the second connecting portion and the drive force for automatic focus adjustment is transmitted to the focus system without being transmitted to the operating ring. Further, even if the zooming operation by the movement of the operating ring in the direction of the optic axis is performed during the automatic mode, there will be no hindrance to the automatic focus adjusting operation owing to the first connecting portion.

BRIEF DESCRIPTION OF THE DRAWINGS

FIG. 5 is a cross-sectional view taken along line V—V of FIG. 1.

FIG. 6 is a cross-sectional view taken along line VI—VI of FIG. 1.

DESCRIPTION OF THE PREFERRED EMBODIMENTS

Figure 1:
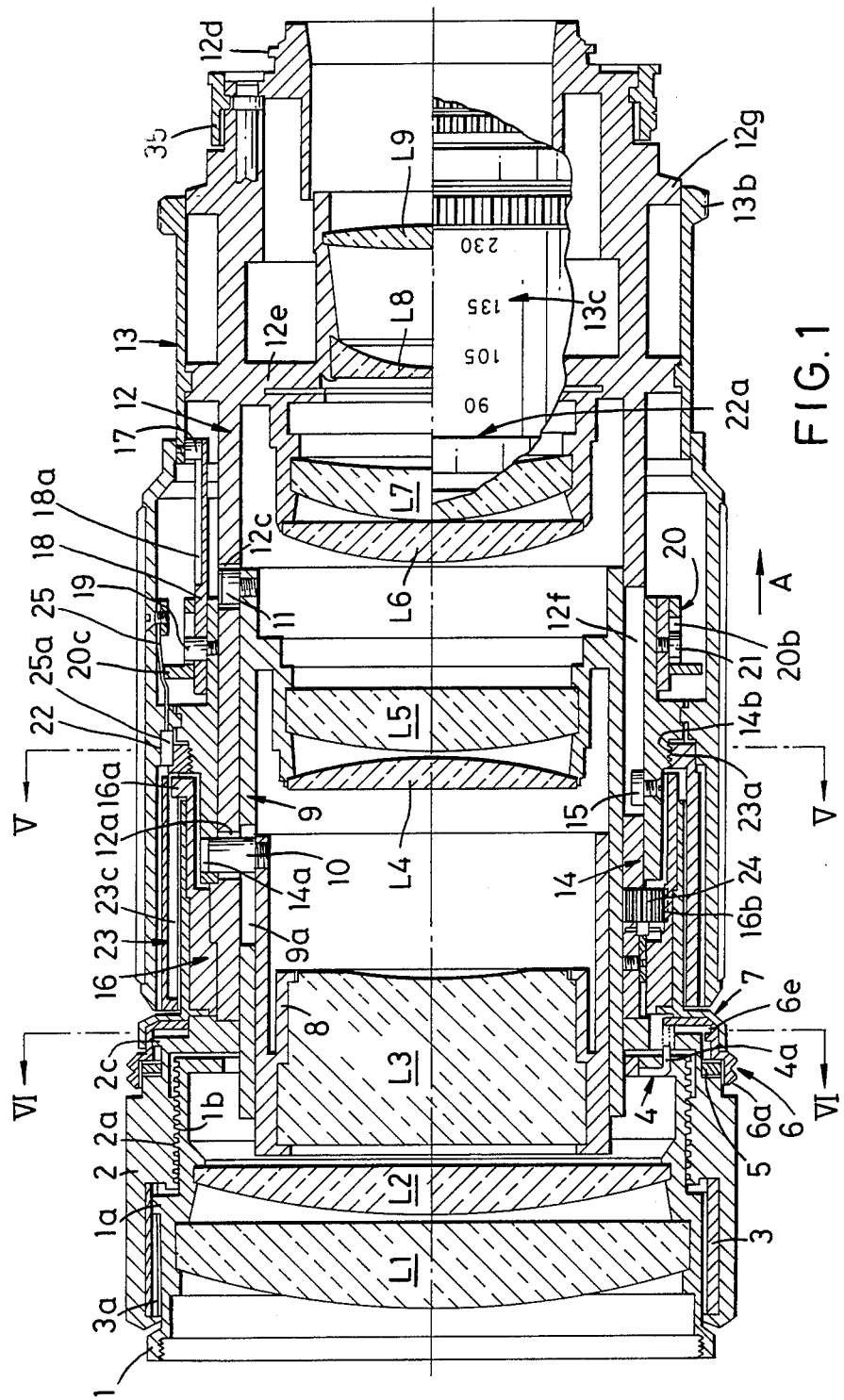
FIG. 1 is a longitudinal cross-sectional view of a zoom lens according to a first embodiment of the present invention.

FIG. 1 is a longitudinal cross-sectional view of a zoom lens barrel according to an embodiment of the present invention. The zoom lens barrel has, a phototaking optical system comprising, in succession from the object side in the direction of the optic axis, a first lens unit $L_1$ and $L_2$, (focusing portion) a second lens unit $L_3$, and a third lens unit $L_4$ and $L_5$ (zooming portion), and a fourth lens unit $L_6$–$L_9$. By the first lens unit being moved in the direction of the optic axis, focusing operation is accomplished, and by the second and third lens units being moved in the direction of the optic axis, zooming is accomplished. The fourth lens unit is a relay lens unit which is fixed.

A holding frame 1 holds the first lens unit $L_1$ and $L_2$ integrally in the inner peripheral portion thereof. A projection 1a protruding radially outwardly is provided substantially at the center of outer peripheral surface of the holding frame 1 in the direction of the optic axis and is slidably engaged with a slot 3a parallel to optic axis which is formed in the inner peripheral portion of a distance scale ring 3 which will hereinafter be described. A thread 1b is formed on the outer periphery of the holding frame 1, and a rectilinear key 4 is secured to the inner wall thereof.

The distance scale ring 3 is fitted to the inner peripheral portion of a fixed cylinder 2 for rotation about the optic axis, and a thread 2a threadably engaged with the thread 1b is formed on the inner peripheral portion of the fixed cylinder 2.

A wall portion 2c protruding radially outwardly is provided on the outer peripheral surface of the fixed cylinder 2, and in the outer peripheral surface of the wall portion 2c, as shown in FIG. 6, a plurality of grooves 2d extending in the direction of the optic axis are formed at predetermined intervals circumferentially thereof.

Two elongated portions 4a and 4b of the rectilinear key 4 which are parallel to the optic axis are fitted in a groove (not shown) parallel to the optic axis which is formed on the outer peripheral surface of a segment gear member 16 and therefore, the holding frame 1 may rotate with the segment gear member 16 even if it is moved in the direction of the optic axis.

A zone setting ring 6 has a knurled portion 6a on the outer peripheral portion thereof and is biased rightwardly by a wave washer 5 as viewed in FIG. 1 and therefore is fixed integrally with the fixed cylinder 2. The zone setting ring 6 is kept in the shown position by a keeper ring 7. As shown in FIG. 6, an inwardly protruding projection 6d is provided at the center of the bore portion of the zone setting ring 6, and this projection 6d engages one of the aforementioned grooves 2d of the fixed cylinder 2 to control the relative rotation of the zone setting ring 6 and the fixed cylinder 2. Further, two protrusions 6f and 6g (FIG. 6) are provided on portions of the zone setting ring 6, and when the zone setting ring 6 is rotated, these protrusions 6f and 6g can bear against the elongated portions 4a and 4b, respectively, of the rectilinear key 4 to control the rotation thereof.

A circumferential groove 6e is formed in the inner periphery of the zone setting ring 6. The inner diameter of this circumferential groove 6e is somewhat larger than the outer diameter of the wall portion 2c of the fixed cylinder 2 and the width thereof is somewhat greater than that of the wall portion 2c and therefore, when the zone setting ring 6 is moved to the left as viewed in FIG. 1 against the biasing force of the wave washer 5, the zone setting ring 6 becomes rotatable about the optic axis.

A holding frame 8 holds the second lens unit $L_3$ by the inner peripheral portion thereof, and the outer peripheral portion thereof is fitted to a holding frame 9 for holding the third lens unit $L_4$, $L_5$. A pin 10 is studded on the holding frame 8, and extends through a rectilinear slot 9a in the holding frame 9 and a slot 12a in a fixed cylinder 12 of a body which is inclined with respect to the optic axis, and fits in a circumferential groove 14a formed in the inner peripheral portion of a zooming intermediate cylinder 14.

The outer peripheral portion of the holding frame 9 is fitted to the inner peripheral portion of the fixed cylinder 12. A pin 11 is studded on the side surface of the holding frame 9 and fits in a cam slot 12c in the fixed cylinder 12.

A bayonet mount portion 12d for engagement with a camera body is fitted to the fixed cylinder 12, and an aperture ring 35 is fitted on the margin thereof. A wall portion 12e for holding the fourth lens unit $L_6$–$L_9$ is provided at the center of the bore portion of the fixed cylinder 12. At the center of the outer diameter portion of the fixed cylinder 12, a change-over ring 13 is fitted for rotation about the optic axis only by a predetermined angle, and toward the object from the center, the zooming intermediate cylinder 14 is fitted for movement only in the direction of the optic axis by a pin 15 and a rectilinear slot 12f in the fixed cylinder 12 which is parallel to the optic axis.

On the outer peripheral portion of the fixed cylinder 12 which is closer to the object, a segment gear member 16 is fitted for rotation about the optic axis. A pin 17 is studded on the change-over ring 13 so as to protrude inwardly, and the pin 17 is fitted in a slot 18a parallel to the optic axis which is formed in a change-over intermediate ring 18.

A scale 13c representative of the focal length, etc. of zoom is formed on the outer peripheral surface of the change-over ring 13 along a direction parallel to the optic axis. An annular flange portion 13b is also provided on the change-over ring 13, and this flange portion 13b is rotatable relative to an annular flange portion 12g provided on the outer peripheral portion of the fixed cylinder 12. On the sides of the flange portions 13b and 12g, index marks are provided at locations visible to the operator, and the change-over between the automatic focusing operation and the manual focusing operation which will be described later may be accomplished by registering the index marks with each other.

A pin 19 is studded on the outer peripheral portion of the zooming intermediate cylinder 14, and the pin 19 is fitted in a circumferential slot 18b (see FIG. 3) formed in a change-over intermediate ring 18 and a slot 20a (see FIG. 3) parallel to the optic axis which is formed in a ring 20 disposed outwardly of the change-over intermediate ring 18. A pin 21 is studded on the outer peripheral portion of the change-over intermediate ring 18, and this pin 21 is fitted in an inclined slot 20b (see FIG. 4) formed in the ring 20.

On the central portion of the outer periphery of the zooming intermediate cylinder 14, a manual operating ring 22 is fitted for rotation about the optic axis, and a fine thread 14b is formed adjacent to the location at which the operating ring is fitted and is threadably engaged with a thread 23a formed on the bore portion of a focusing member sheathed by the zooming intermediate cylinder 14, i.e., a focus intermediate cylinder 23. Accordingly, the focus intermediate cylinder 23 is rotatable about the optic axis.

The aforementioned segment gear member 16 is disposed inwardly of the focus intermediate cylinder 23, and the projection 16a of this segment gear member 16 is engaged with a groove 23c parallel to the optic axis which is formed in the inner peripheral portion of the focus intermediate cylinder 23. A segment gear 16b provided on the inner peripheral portion of the segment gear member 16 is in meshing engagement with a pinion gear 24 having a tip held by a ground plate 36 (see FIG. 2) fixed to the fixed cylinder 12. Gear member 16 and gear 24 form part of a transmission.

The ring 20 further has a flange 20c, and by the ring 20 being moved toward the object in the direction of the optic axis, the flange 20c is moved to push a leaf spring 25 radially outwardly.

The leaf spring 25 has one end thereof fixed to the inner peripheral portion of the manual operating ring 22, and the other end portion thereof is provided with an engagement piece 25a formed of synthetic resin. The leaf spring 25 as a whole is normally biased radially inwardly. A plurality of grooves 23b (see FIG. 5) engageable by the engagement piece 25a to form a clutch are formed at predetermined intervals on the circumference of the focus intermediate cylinder 23 at the end thereof which is adjacent to the camera body.

Figure 2:
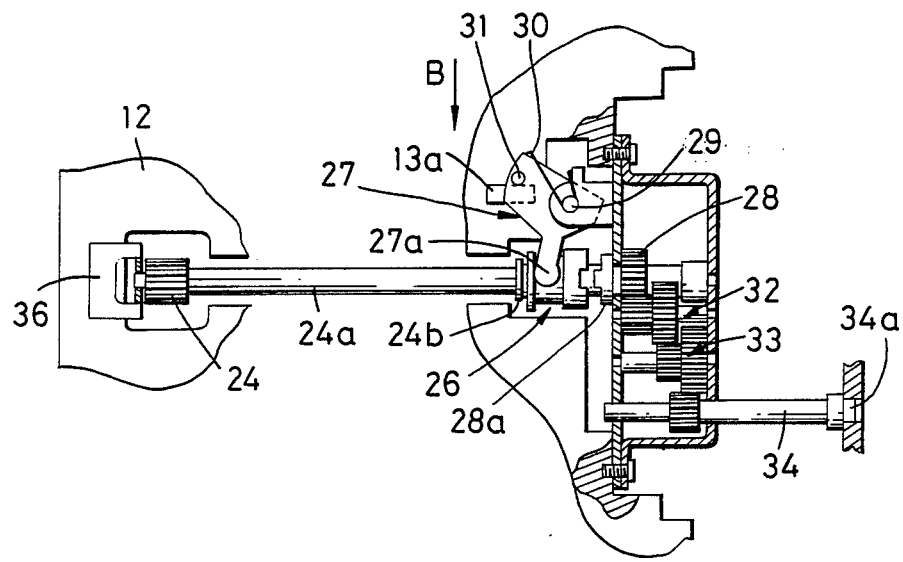
FIG. 2 illustrates the gear connecting portion of FIG. 1.

Referring now to FIG. 2, the pinion gear 24 has a shaft portion 24a extending toward the camera body. A flange 24b is provided on the shaft portion 24a, and a clutch ring 26 is slidably fitted to the opposite side of the flange 24b. The two members 24b, 26 are designed to rotate integrally as a unit. The disk-like end 27a of a clutch lever 27 is fitted in an annular groove formed centrally of the clutch ring 26. A concave groove engaged by a convex projection 28a provided on a clutch gear 28 is formed in the end portion of the clutch ring.

The clutch lever 27 is adapted to rotate about a shaft 29, and is biased counter-clockwise by a spring 30. A pin 31 is provided on the clutch lever 27 and bears against the projection 13a provided on the change-over ring 13 and thus, rotation of the clutch lever 27 is restricted.

The clutch gear 28 is in meshing engagement with a gear on a coupling shaft 34 (drive member) via step gears 32 and 33 for speed reduction. A coupling portion 34a for engagement with the coupling shaft of the camera body is provided at one end of the coupling shaft 34, and is connected to a drive motor (not shown) in the camera body so as to be driven thereby.

The operation of the zoom lens barrel of the present invention will be described hereinafter. In FIG. 1, when the operating ring 22 is moved in the direction of arrow A, zooming is accomplished and at that time, the zooming intermediate cylinder 14 is also moved in the direction shown by arrow A. The pin 10 is also moved in the direction shown by arrow A because it is engaged with the circumferential groove 14a formed in the inner peripheral surface of the zooming intermediate cylinder 14. The pin 10 is also engaged with the inclined slot 12a in the fixed cylinder 12 and thus, it rotates about the optic axis. At the same time, the holding frame 9 is rotated with the aid of the rectilinear slot 9a formed therein and simultaneously with rotation, it moves by a predetermined amount in the direction of the optic axis along the cam slot 12c of the fixed cylinder 12. The holding frame 8 is moved by a predetermined amount along the optic axis by the pin 10 moving, whereby zooming is accomplished.

The focal length of the lens system provided by this zooming can be known from the aforementioned scale 13c provided on the surface of the change-over ring 13. That is, the content of the scale is displayed so that the then focal length appears at the position indicated by the end 22a of the manual operating ring 22.

(Manual Focusing Operation)

The manual focusing operation will be described hereinafter. FIG. 1 shows the condition during manual focusing. When the manual operating ring 22 is first rotated, the focus intermediate cylinder 23 also rotates therewith because the engagement piece 25a of the leaf spring 25 attached to the inner peripheral surface of the operating ring is in engagement with one of the grooves 23b of the focus intermediate cylinder 23. Since the projection 16a of the segment gear member 16 is in engagement with the rectilinear groove 23c of the focus intermediate cylinder 23, the segment gear member 16 also rotates and further, the rectilinear key 4 is rotated with the aid of a groove (not shown) parallel to the optic axis which is formed in the segment gear member 16. As a result, the first lens unit holding frame 1 rotates, and by the engagement between the threads 1b and 2a, the holding frame 1 is moved in the direction of the optic axis while rotating, whereby the focusing operation is accomplished.

When the holding frame 1 rotates, the distance scale ring 3 also rotates by the same angle as the holding frame 1 because the projection 1a provided on the outer peripheral surface of the holding frame 1 is fitted in the slot 3a of the distance scale ring 3 which is parallel to the optic axis. Further, when the segment gear member 16 rotates, the pinion gear 24 is also rotated by the segment gear 16b provided on the inner peripheral portion of the segment gear member 16 (see FIG. 2) and the clutch ring 26 is also rotated, but the clutch gear 28, the step gear 32, the step gear 33 and the coupling shaft 34 do not rotate because the groove formed in the clutch ring 26 and the concave groove formed in the clutch gear 28 are separated from each other. Thus, during the manual focusing operation, the operative association between the motor in the camera body and the focusing mechanism in the zoom lens is cut off.

(Automatic Focusing Operation)

Figure 3:
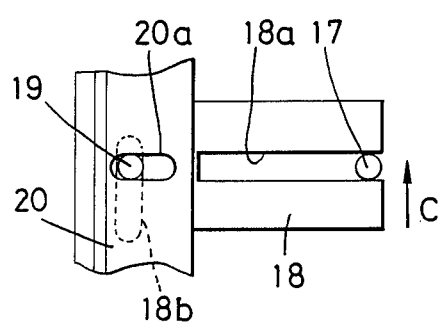
FIG. 3 is an enlarged plan view of essential portions of FIG. 1.
Figure 4:
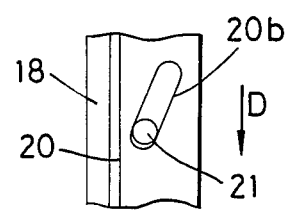
FIG. 4 is an enlarged plan view of essential portions of FIG. 1.

The change-over from the above-described manual focusing operation to the automatic focusing operation is accomplished in the following manner. When the change-over ring 13 is first rotated, the projection 13a provided on the inner peripheral surface of the change-over ring 13 moves in the direction shown by arrow B in FIG. 2 and the clutch lever 27 is rotated counter-clockwise by the biasing force of the spring 30. As a result, the clutch ring 26 is moved to the right as viewed in FIG. 2 and becomes coupled to the clutch gear 28. Simultaneously therewith, as shown in FIG. 3, the pin 17 provided on the inner peripheral surface of the change-over ring 13 fits in the rectilinear slot 18a of the change-over intermediate ring 18. Consequently, the change-over intermediate ring 18 rotates in the direction shown by arrow C in FIG. 3 and in the direction shown by arrow D in FIG. 4, and the ring 20 moves to the left as viewed in FIG. 1 because the pin 21 provided on the change-over intermediate ring 18 is engaged with the inclined slot 20b of the ring 20 and the pin 19 studded on the zooming intermediate cylinder 14 is engaged with the rectilinear slot 20a of the ring 20. when the ring 20 moves in this manner, it pushes the leaf spring 25 toward the outer periphery by the wall portion 20c thereof, whereby the engagement between the groove 23b of the focus intermediate cylinder 23 and the engagement piece 25a of the leaf spring 25 is released.

During automatic focusing, a coupling, not shown, on the camera body side is engaged with the coupling portion 34a, and the coupling shaft 34, the step gear 32, the step gear 33 and the clutch gear 28 rotate. At this time, the groove in the clutch ring 26 is engaged by the projection 28a of the clutch gear 28 and therefore, the clutch ring 26 rotates and the pinion gear 24 also rotates. As the pinion gear 24 rotates, the segment gear member 16 also rotates and thereafter, the focusing operation is performed as during the aforedescribed manual focusing operation. During this automatic focusing operation, the projection 16a provided on the outer peripheral portion of the segment gear member 16 is in engagement with the rectilinear groove 23c formed in the inner peripheral surface of the focus intermediate cylinder 23 and therefore, the focus intermediate cylinder 23 also rotates at the same time, but the manual operating ring 22 does not rotate because the groove 23b of the focus intermediate cylinder 23 is out of engagement with the engagement piece 25a of the leaf spring 25. In the present embodiment, the change-over ring 13, the change-over intermediate ring 18, the ring 20, the leaf spring 25 and the groove 23b together constitute a change-over mechanism.

Reference is now made to FIG. 6 to describe an in-focus zone setting mechanism briefly. In FIG. 6, the projection 6d on the inner peripheral portion of the zone setting ring 6 is in engagement with a groove 2d-1 of the fixed cylinder 2. At this time, the protrusions 6f and 6g provided on the inner periphery of the zone setting ring 6 are in their solid line positions and the rectilinear key 4 fixed to the holding frame 1 can move in the direction of arrows from the infinity position and rotate to the close distance position. When the zone setting ring 6 is moved to the left as viewed in FIG. 1 against the biasing force of the wave washer 5 to disengage the projection 6d from the groove 2d-1 and is rotated, for example, clockwise as viewed in FIG. 6 to bring the projection 6d into engagement with an adjacent groove 2d-2 the protrusions 6f and 6g move to the positions indicated by phantom lines, whereby the limit of the angle of rotation of the rectilinear key 4 on the close distance side can be changed. Conversely, when the zone setting ring 6 is rotated counter-clockwise, the angle of rotation of the rectilinear key 4 on the infinity position side can be limited. Thus, by suitably rotating the zone setting ring 6, setting of the in-focus zone can be accomplished simply.

Figure 7:
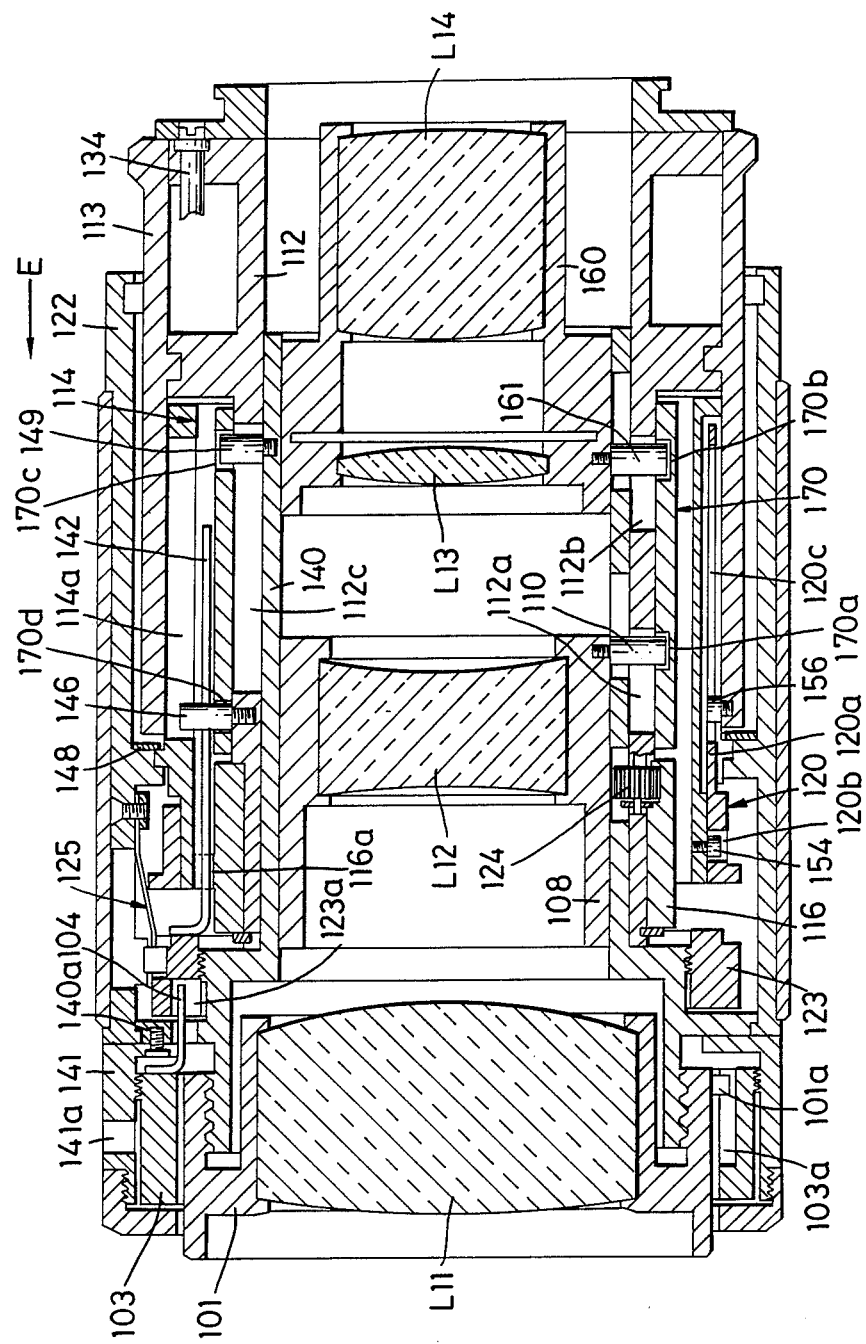
FIG. 7 is a longitudinal cross-sectional view of a zoom lens according to a second embodiment of the present invention.

A second embodiment of the zoom lens assembly according to the present invention will now be described with reference to FIG. 7.

The zoom lens includes a fixed barrel 112, a moving frame 140 fitted to the inner peripheral surface thereof, a focus intermediate cylinder 123 threadably engaged with the outer peripheral surface thereof, a change-over ring 113 fitted to the outer peripheral surface of the fixed barrel 112, and an operating ring 122.

A holding frame 101 threadably engaged with the moving frame 140 holds a first lens unit $L_{11}$ on the inner peripheral portion thereof, and a radially protruding projection 101a is provided on the outer peripheral surface thereof. The moving frame 140 is slidable in the direction of the optic axis and slidably holds a holding frame 108 holding a second lens unit $L_{12}$ on the inner peripheral surface thereof.

A flange 140a is provided on the moving frame 140 adjacent to the first lens unit $L_{11}$, and an outer barrel 141 is secured thereto. The inner peripheral surface of the outer barrel 141 is threadably engaged with a distance scale ring 103 to be rotatable. The distance scale on the distance scale ring 103 can be observed through a window 141a in the barrel 141.

The projection 101a of the holding frame 101 is slidably engaged with a rectilinear groove 103a in the distance scale ring 103. An interlocking key 104 is secured to the distance scale ring 103. The interlocking key 104 is in engagement with the cutaway portion 123a of the focus intermediate cylinder 123. The focus intermediate cylinder 123 is threadably engaged with the outer peripheral surface of the moving frame 140, whereby the focus intermediate cylinder is rotatable. A rectilinear key 142 is secured to the focus intermediate cylinder 123, and is in engagement with a key way 116a in a segment gear member 116. The segment gear member 116 is rotatably fitted to the outer peripheral surface of the fixed barrel 112 and is in meshing engagement with a pinion gear 124 in the inner peripheral surface thereof.

The operating ring 122 is rotatably held between the moving frame 140 and the outer barrel 141, and a sliding cylinder 114 is fitted to the inner peripheral surface of the change-over ring 113 for sliding movement in the direction of the optic axis. The change-over ring 113 is held on the fixed barrel for rotation by a predetermined angle, and a scale representative of the focal lengths of zoom, etc. is provided on the outer peripheral surface thereof. Since a pin 146 studded on the fixed barrel fits in a rectilinear slot 114a, the sliding cylinder 114 is not rotatable. The sliding cylinder 114 is held between the operating ring 122 and a keeper plate 148 and is movable in the direction of the optic axis with the operating ring 122.

A ring 120 is fitted on the outer peripheral surface of the sliding cylinder 114, and a portion thereof is extended rearwardly to provide an extension 120a. The ring 120 is formed with a lead slot 120b similar to the slot 20b of FIG. 4, and a pin 154 studded on the sliding cylinder 114 fits in the lead slot 120b. Also, a pin 156 studded on the change-over ring 113 fits in a rectilinear slot 120c formed in the extension 120a. Thus, when the change-over ring 113 is rotated, the ring 120 rotates by the same amount as the change-over ring and also moves in the direction of the optic axis.

The ring 120 serves similarly to the ring 20 in the embodiment of FIG. 1, that is, pushes a leaf spring 125 radially outwardly and brings it into and out of engagement with a plurality of grooves in the focus intermediate cylinder 123.

A pin 110 is studded on the holding frame 108, and a pin 161 is studded on a holding frame 160 holding third and fourth lens units $L_{13}$ and $L_{14}$.

The pins 110 and 161 extend through escape slots in the moving frame 140 and are engaged with rectilinear slots 112a and 112b, respectively, in the fixed barrel 112, and further fit in cam slots 170a and 170b, respectively, in a cam cylinder 170 fitted to the outside of the fixed barrel. Also, a pin 149 is studded on the moving frame 140 and is engaged with a rectilinear slot 112c in the fixed barrel and also fits in a lead slot 170c in the cam cylinder 170. Accordingly, the cam cylinder 170 can not move in the direction of the optic axis, but can only rotate.

Focusing is accomplished by the first lens unit $L_{11}$ being moved, and zooming is accomplished by the second, third and fourth lens units $L_{12}$, $L_{13}$ and $L_{14}$ being moved in the direction of the optic axis.

The clutch mechanism between a coupling shaft 134 coupled to the coupling shaft of a camera body and a pinion gear 124 is constructed similarly to that shown in FIG. 2.

The operation of the present embodiment will hereinafter be described.

Zooming will first be described. When the operating ring 122 is moved in the direction shown by arrow E in FIG. 7, the moving frame 140 moves therewith and the first lens unit $L_1$ moves through the holding frame 101, and the cam cylinder 170 is rotated due to the engagement between the pin 149 and the rectilinear slot 112c and between the pin 149 and the lead slot 170c. At this time, the sliding cylinder 114 also moves therewith. When the cam cylinder 170 is rotated, the moving frame 108 and the moving frame 160 move in the direction of the optic axis due to the engagement of the pins 110 and 161 with the cam slots 170a, 170b and the rectilinear slots 112a, 112b of the fixed barrel 112, and the second lens unit $L_{12}$, the third lens unit $L_{13}$ and the fourth lens unit $L_{14}$ are moved, whereby zooming is accomplished.

Manual focusing will now be described. When the operating ring 122 is rotated, the focus intermediate cylinder 123 rotates with the operating ring 122 because the engagement piece of the leaf spring 125 is engaged with a groove, and also the distance scale ring 103 rotates with the operating ring 122 because the interlocking key 104 is engaged with the cut-away 123a. When the distance scale ring 103 rotates, the holding frame 101 also rotates, and the holding frame 101 moves in the direction of the optic axis through the intermediary of the threadable engagement thereof with the moving frame 140, and the first lens unit $L_{11}$ is thus moved, whereby focusing is accomplished.

When the focus intermediate cylinder 123 rotates, the segment gear member 116 rotates through the intermediary of the rectilinear key 142 and the pinion gear 124 rotates, but the coupling shaft 134 does not rotate because the clutch is in OFF state. That is, the focusing mechanism in the lens barrel is disconnected from the drive motor in the camera body.

When the change-over ring 113 is rotated to rotate the clutch lever 27 in FIG. 2 counter-clockwise, the pinion gear 124 and the coupling shaft 134 come into engagement with each other as in the previously described embodiment. Simultaneously therewith, the ring 120 also rotates because the pin 156 on the change-over ring 113 fits in the rectilinear slot 120c. At this time, the pin 154 on the sliding cylinder 114 fits into the lead slot 120b in the ring 120 and moreover, the sliding cylinder 114 cannot rotate and therefore, the ring 120 moves toward the object while rotating.

Along therewith, the ring 112 cuts off the coupling between the operating ring 122 and the focus intermediate cylinder 123 through the intermediary of the leaf spring 125.

During automatic focusing, the coupling shaft 134 is in engagement with the coupling portion, not shown, of the camera body and therefore, the pinion gear 124 is rotated by the focusing drive from the camera body. As the pinion gear 124 is thus rotated, the segment gear member 116 rotates, whereby the first lens unit $L_{11}$ is moved by an operation similar to that during the aforedescribed manual focusing and thus, the focusing operation is accomplished.

During this automatic focusing operation, the rectilinear key 142 is engaged with the key way 116a provided in the outer peripheral portion of the segment gear member 116 and therefore, the focus intermediate cylinder 123 also rotates at the same time. However, the coupling by the leaf spring 125 is released and the operating ring 122 does not rotate.

We claim:

1. A zoom lens assembly comprising:
a photo-taking optical system having a focusing portion and a zooming portion adapted to be moved in the direction of an optic axis, respectively;
manual operating means movable in the direction of said optic axis for zooming and rotatable about said optic axis for focusing;
an electrically rotated drive member;
zoom intermediate means for moving said zooming portion of said photo-taking optical system for zooming in response to the movement of said manual operating means in the direction of the optic axis;
a focus intermediate member rotatable in response to the rotation of said manual operating means to move said focusing portion of said photo-taking optical system for focusing, and movable in the direction of the optic axis with said manual operating means;
transmission means for coupling said focus intermediate member to said drive member to transmit the rotation of said drive member to said focus intermediate member irrespective of the movement of said focus intermediate member in the direction of the optic axis; and
change-over means operable to connect and disconnect the rotation of said manual operating means and said focus intermediate member.

2. A zoom lens assembly according to claim 1, wherein said change-over means includes first clutch means provided between said manual operating means and said focus intermediate member and said transmission means includes second clutch means operable to connect and disconnect the rotation of said drive member and said focus intermediate member, and wherein said change-over means further includes means for operating said first and second clutch means so that said drive member and said focus intermediate member are disconnected by said second clutch means when said manual operating means and said focus intermediate member are coupled together by said first clutch means and so that said manual operating means and said focus intermediate member are disconnected by said first clutch means when said drive member and said focus intermediate member are coupled together by said second clutch means.

3. A zoom lens assembly according to claim 1, wherein said transmission means includes a rotational member rotated about said optic axis by said drive member and coupled to said focus intermediate member.

4. A zoom lens assembly according to claim 3, further comprising a lens frame for holding said focusing portion of said photo-taking optical system, said lens frame being coupled to said rotational member and driven by said rotational member.

5. A zoom lens assembly according to claim 3, further comprising a lens frame for holding said focusing portion of said photo-taking optical system, said lens frame being coupled to said focus intermediate member and driven by said focus intermediate member.

6. A zoom lens assembly according to claim 1, wherein said change-over means includes an operating member fixedly provided at a position adjacent to said manual operating means in the direction of said optic axis and rotatively operated about said optic axis, said operating member having an indication around it representative of information regarding the focal length.

7. A zoom lens assembly comprising:
a photo-taking optical system having a focusing portion and a zooming portion adapted to be moved in the direction of an optic axis, respectively;
manual operating means movable in the direction of said optical axis for zooming and rotatable about said optic axis for focusing;
zoom intermediate means for moving said zooming portion of said photo-taking optical system for zooming in response to the movement of said manual operating means in the direction of the optic axis;
first focus intermediate means for moving said focusing portion of said photo-taking optical system in response to the rotation of said manual operating means;
an electrically rotated drive member;
second focus intermediate means for moving said focusing portion of said photo-taking optical system in response to the rotation of said drive member;
first clutch means provided between said manual operating means and said first focus intermediate means;
second clutch means provided between said drive member and said second focus intermediate means; and
change-over means for operating said first and second clutch means so that said drive member and said second focus intermediate means are disconnected by said second clutch means when said manual operating means and said first focus intermediate means are coupled together by said first clutch means and so that said manual operating means and said first focus intermediate means are disconnected by said first clutch means when said drive member and said second focus intermediate means are coupled together by said second clutch means.

8. A zoom lens assembly according to claim 7, wherein said first focus intermediate means includes coupling means provided to couple said manual operating means and said focusing portion of said photo-taking optical system for the rotation of said manual operating means and to make said focusing portion of said photo-taking optical system independent of said manual operating means for the movement of said manual operating means in the direction of the optic axis.

9. A zoom lens assembly according to claim 8, wherein said coupling means includes a first connecting member rotatable by said first clutch means in operative association with the rotation of said manual operating means and a second connecting member rotatable in operative association with the rotation of said first connecting member and provided in said first connecting member for movement in the direction of the optic axis, and said first focus intermediate means further includes means for moving said focusing portion of said photo-taking optical system in response to the rotation of said second connecting member.

10. A zoom lens assembly according to claim 9, wherein said second focus intermediate means includes means for transmitting the rotation of said drive member to said second connecting member through said second clutch means.

11. A zoom lens assembly according to claim 7, wherein said second focus intermediate means includes a first rotational member rotated by said drive member through said second clutch means, a second rotational member rotated in operative association with said first rotational member and provided in said first rotational member for movement in the direction of the optic axis, and means for moving said focusing portion of said photo-taking optical system in response to the rotation of said second rotational member, said second rotational member being provided integrally with said manual operating means for movement in the direction of the optic axis and being coupled to said manual operating means through said first clutch means for rotation about the optic axis.

12. A zoom lens assembly according to claim 7, wherein said change-over means includes an operating member fixedly provided at a position adjacent to said manual operating means in the direction of said optic axis and rotatively operated about said optic axis, said operating member having an indication representative of information regarding the focal length around it.

13. A zoom lens assembly comprising:
a photo-taking optical system having a focusing portion and a zooming portion adapted to be moved in the direction of an optic axis, respectively;
a manual operating cylinder member movable in the direction of said optic axis for zooming and rotatable about said optic axis for focusing;
zoom intermediate means for moving said zooming portion of said photo-taking optical system in response to the movement of said manual operating cylinder member in the direction of the optic axis;
first focus intermediate means for moving said focusing portion of said photo-taking optical system in response to the rotation of said manual operating cylinder member;
an electrically rotated drive member;
second focus intermediate means for moving said focusing portion of said photo-taking optical system in response to the rotation of said drive member;
clutch means provided for selectively enabling said first focus intermediate means and said second focus intermediate means;
an indication cylinder member having an outer peripheral surface contained inside said manual operating cylinder member and provided so that said outer peripheral surface is exposed by said manual operating cylinder member being moved in the direction of said optic axis, and having on said outer peripheral surface an indication representative of information regarding the focal length, said indication cylinder member being provided for rotation by a predetermined amount about said optic axis and fixedly in the direction of said optic axis; and
means for operating said clutch means in response to said predetermined amount of rotation of said indication cylinder member.

14. A zoom lens assembly according to claim 13, wherein the indication of said indication cylinder member is provided on the outer peripheral surface of said indication cylinder member along a direction parallel to said optic axis.

15. A zoom lens assembly according to claim 14, wherein the indication of said indication cylinder member is a scale representative of information regarding said focal length, and said manual operating cylinder member has an index mark for indicating a portion of said scale which corresponds to the position thereof in the direction of the optic axis.

* * * * *